United States Patent
Watanabe

(10) Patent No.: US 10,890,731 B2
(45) Date of Patent: Jan. 12, 2021

(54) ADAPTER WITH LC-TYPE TWO-CORE SHUTTER

(71) Applicant: SANWA DENKI KOGYO CO., LTD., Tokyo (JP)

(72) Inventor: Yasuhiro Watanabe, Tokyo (JP)

(73) Assignee: SANWA DENKI KOGYO CO., LTD., Tokyo (JP)

(*) Notice: Subject to any disclaimer, the term of this patent is extended or adjusted under 35 U.S.C. 154(b) by 0 days.

(21) Appl. No.: 16/601,746

(22) Filed: Oct. 15, 2019

(65) Prior Publication Data

US 2020/0132956 A1    Apr. 30, 2020

(30) Foreign Application Priority Data

Oct. 25, 2018  (JP) ................. 2018-201343

(51) Int. Cl.
  *G02B 6/00*  (2006.01)
  *G02B 6/44*  (2006.01)

(52) U.S. Cl.
  CPC ................... *G02B 6/4471* (2013.01)

(58) Field of Classification Search
  CPC .. G02B 6/4471; G02B 6/3879; G02B 6/3877; G02B 6/3825
  See application file for complete search history.

(56) References Cited

U.S. PATENT DOCUMENTS

| | | | |
|---|---|---|---|
| 9,453,963 B2* | 9/2016 | Sato | G02B 6/241 |
| 9,709,754 B2* | 7/2017 | Sanders | G02B 6/3825 |
| 10,012,799 B2* | 7/2018 | Sanders | G02B 6/3849 |
| 2004/0062486 A1* | 4/2004 | Tanaka | G02B 6/3849 |
| | | | 385/55 |
| 2017/0248762 A1* | 8/2017 | Sato | G02B 6/3897 |

FOREIGN PATENT DOCUMENTS

| | | |
|---|---|---|
| JP | 2005-17598 A | 1/2005 |
| JP | 2008-46146 A | 2/2008 |
| JP | 2014139633 A | 7/2014 |
| JP | 2014-219591 A | 11/2014 |
| JP | 2015059941 A | 3/2015 |
| JP | 2015219346 A | 12/2015 |

OTHER PUBLICATIONS

Extended European Search Report in corresponding European Application No. 19203782.8, dated Feb. 24, 2020.

* cited by examiner

*Primary Examiner* — Ellen E Kim
(74) *Attorney, Agent, or Firm* — Bacon & Thomas, PLLC

(57) ABSTRACT

An adapter includes an upper lid housing provided in right and left wall surfaces with locking projections and provided in an upper wall surface with an arm, a shutter plate arranged in an opening side of the upper lid housing in a rising direction, a sleeve holder constructed by a first cylinder and a second cylinder holding a split sleeve therebetween, a lower lid housing provided in right and left wall surfaces with locked hole portions for fitting the locking projections and provided in an upper wall surface with a locking concave portion locking the arm, and a through hole for inserting a fitting projection provided in a protruding manner in a leading end of a bottom plate of the lower lid housing into a lower end of the upper lid housing. Thus, a guiding performance is improved and an LC-type optical connector plug can be housed compactly.

8 Claims, 21 Drawing Sheets

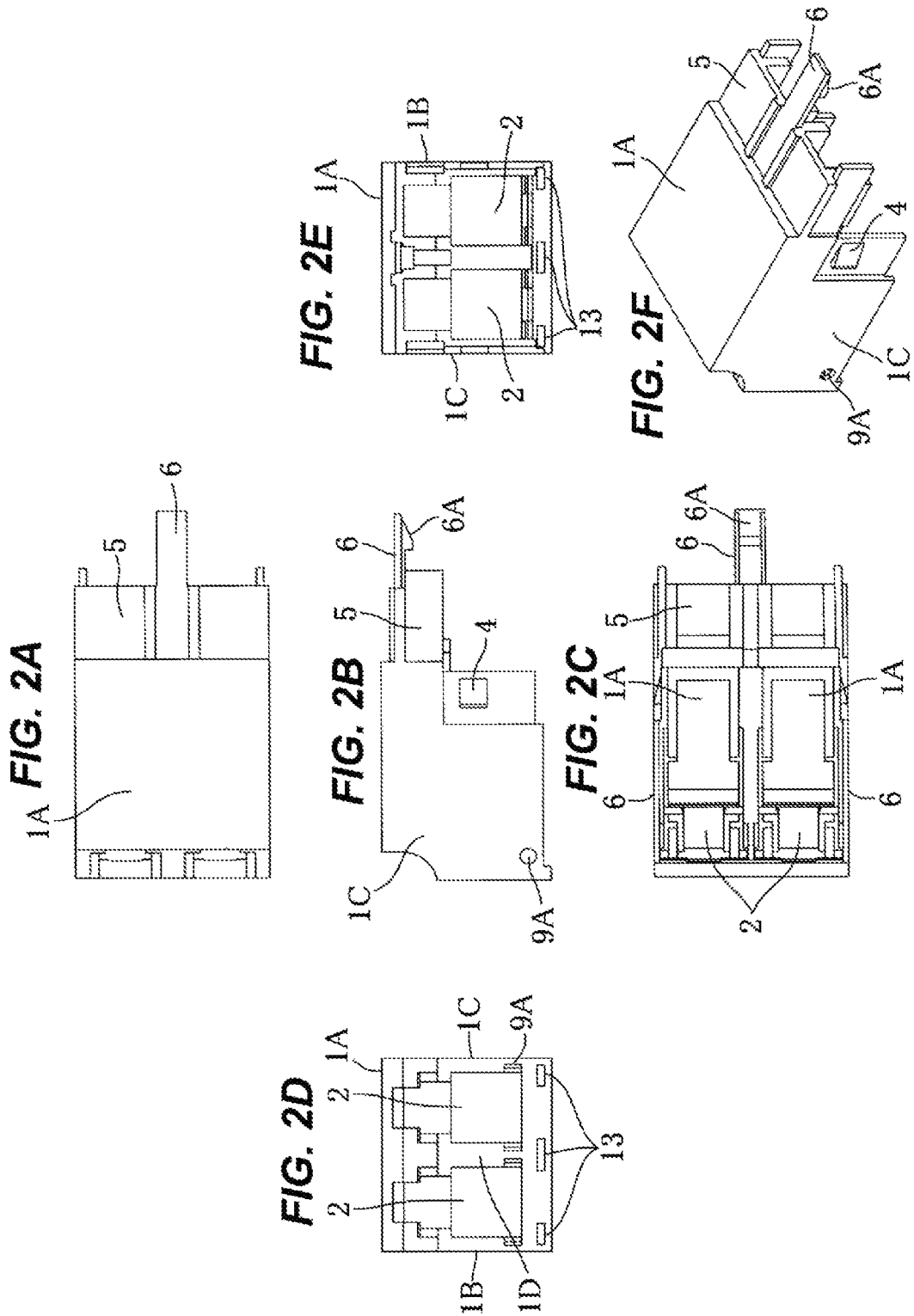

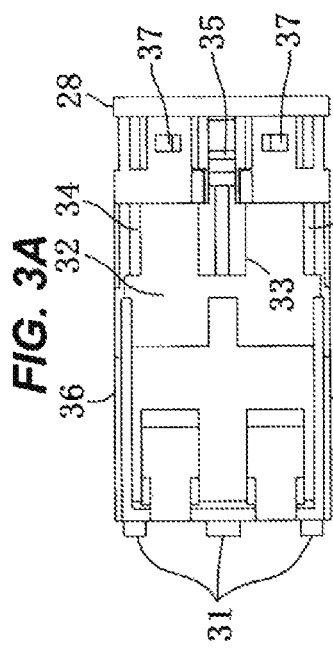
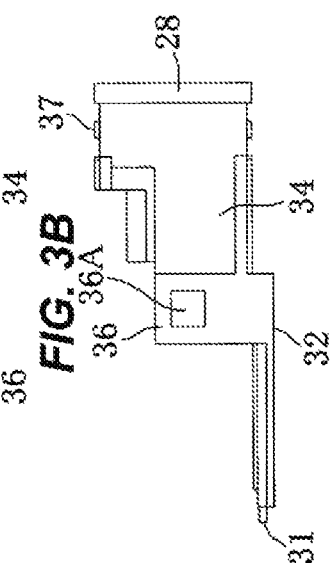
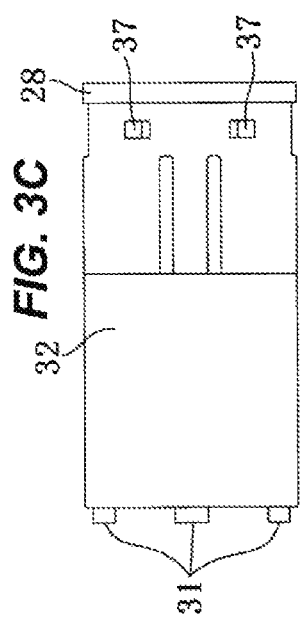
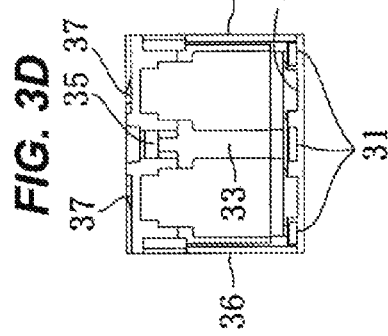
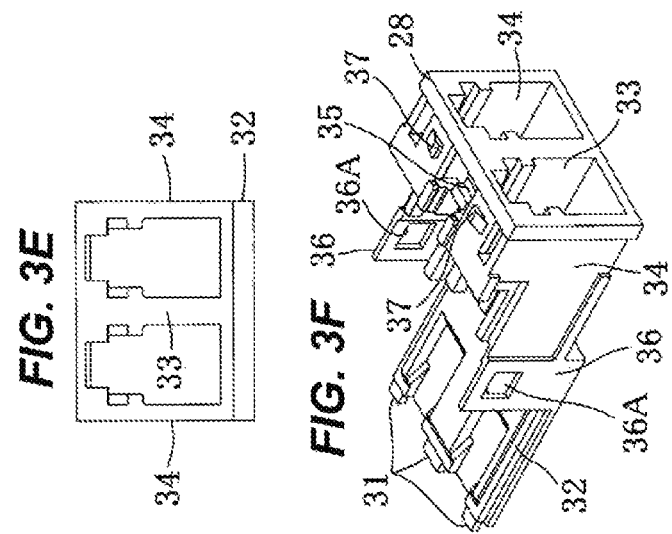

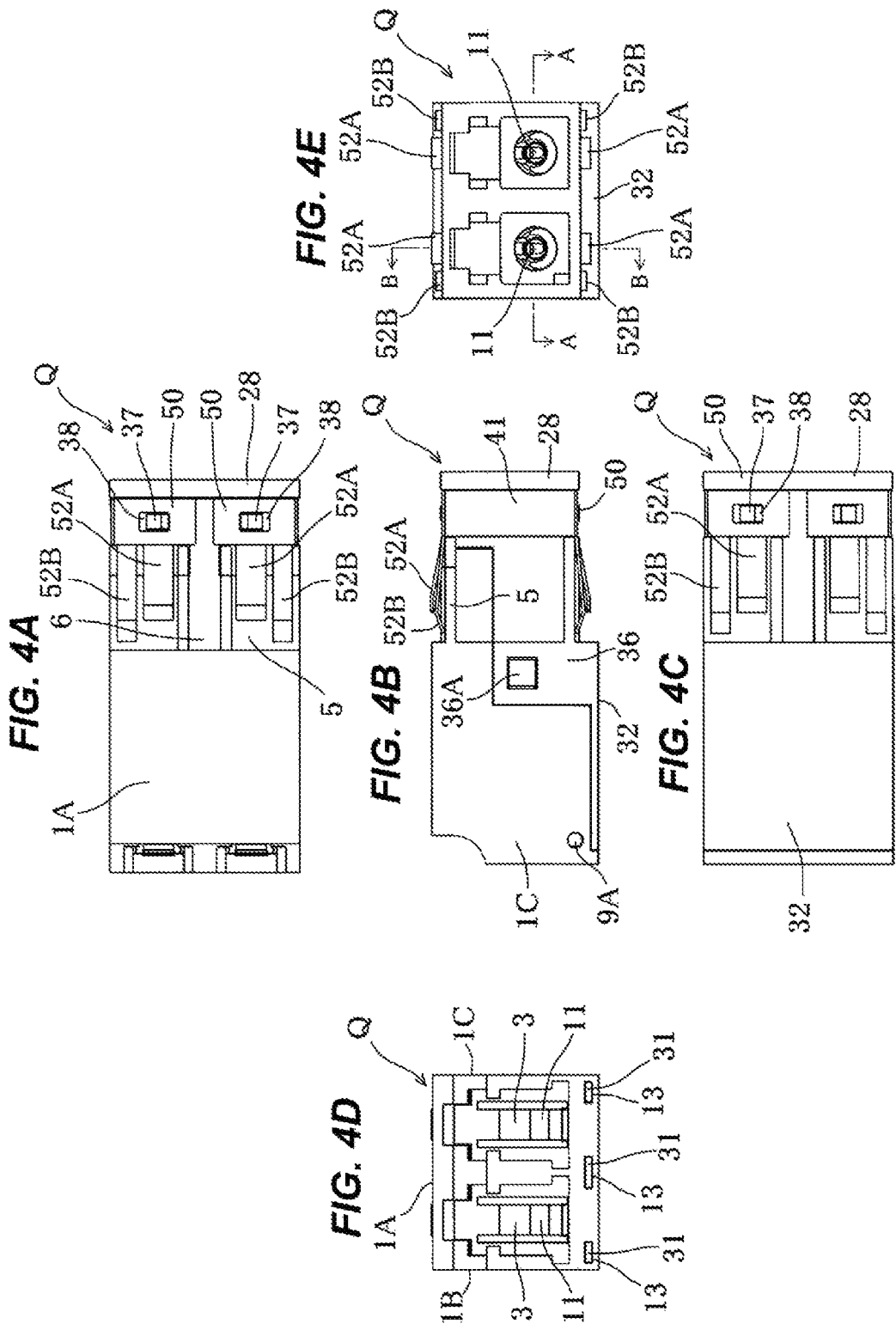

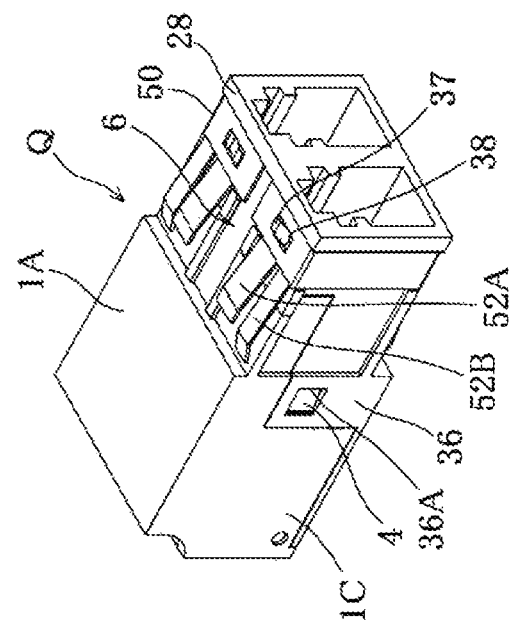
FIG. 5A
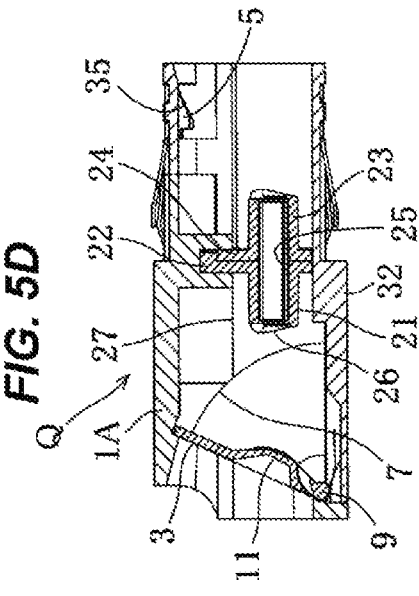
FIG. 5B
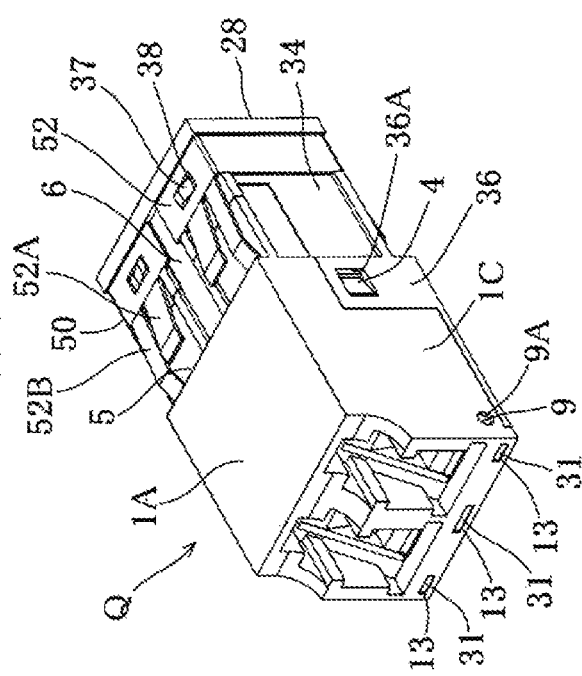
FIG. 5C
FIG. 5D

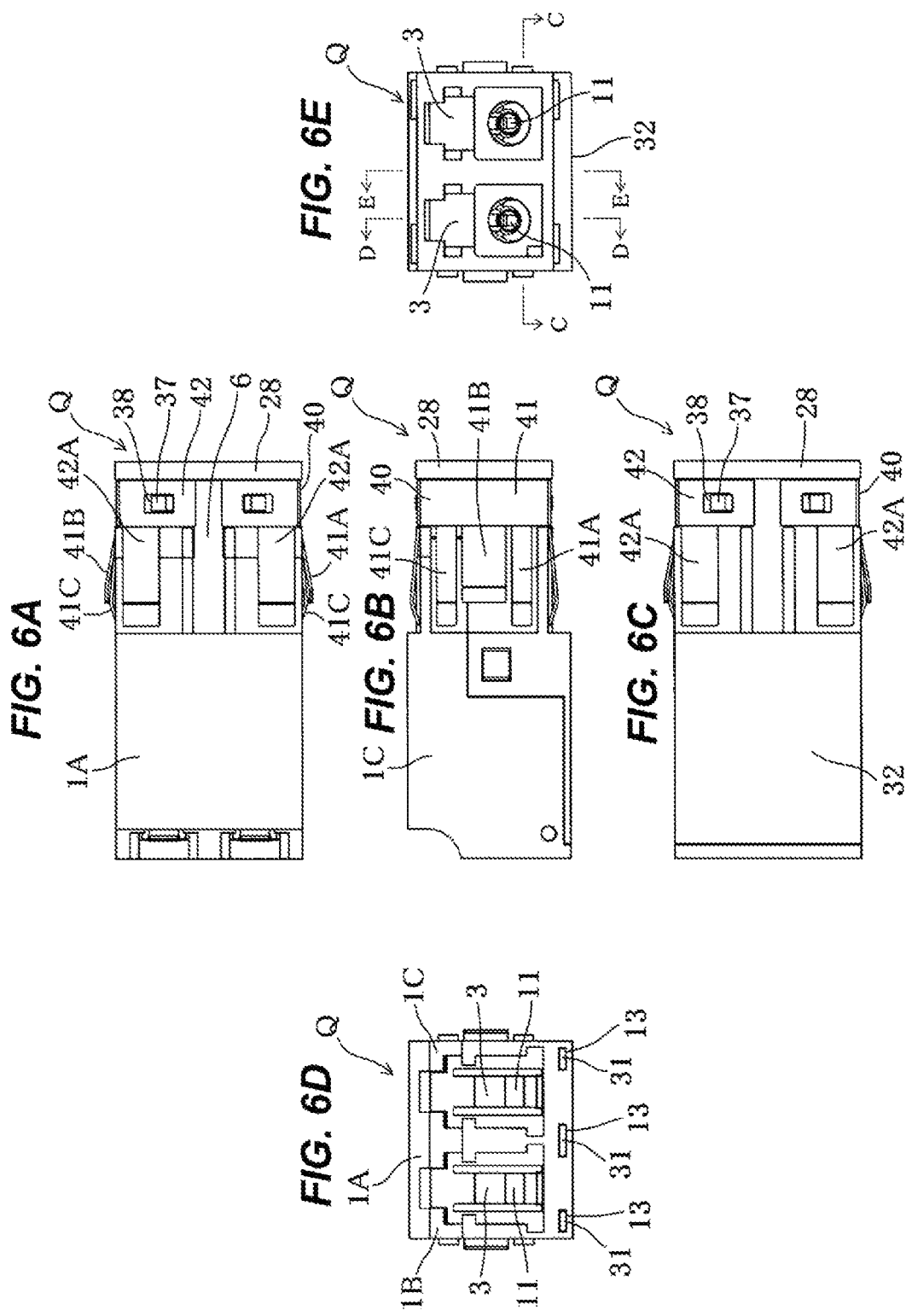

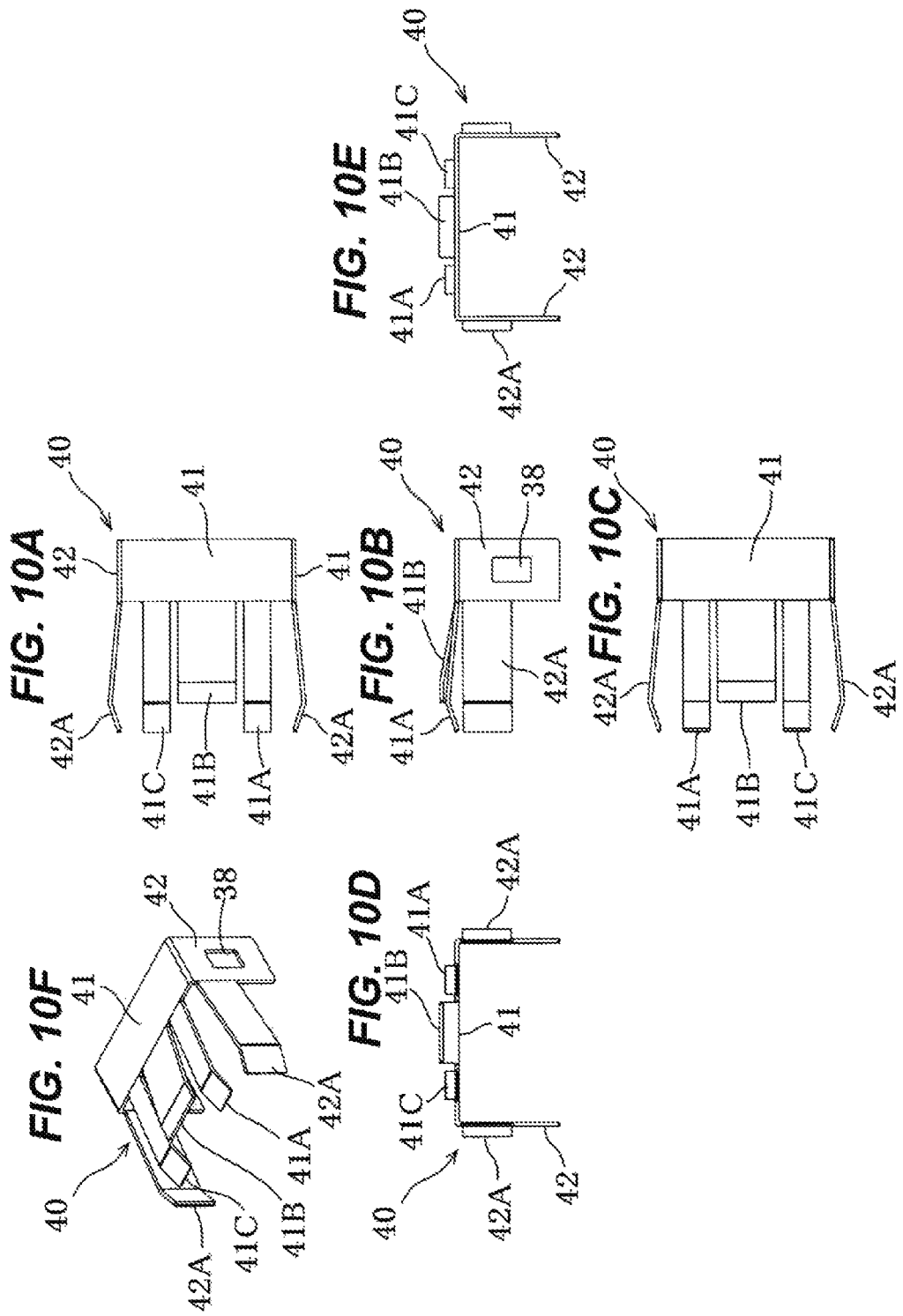

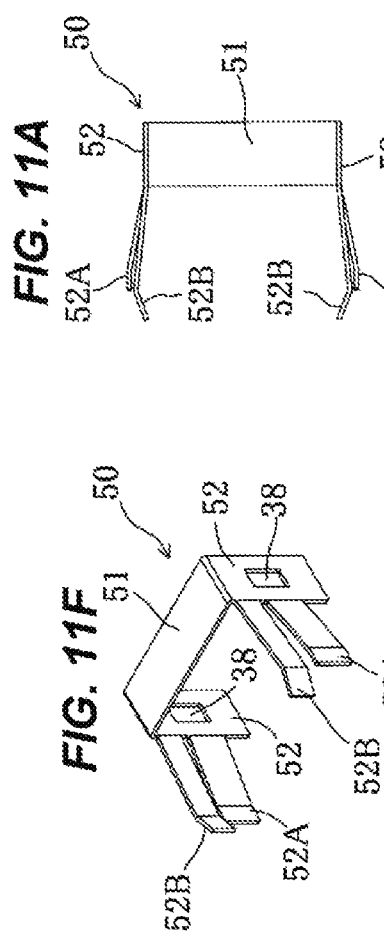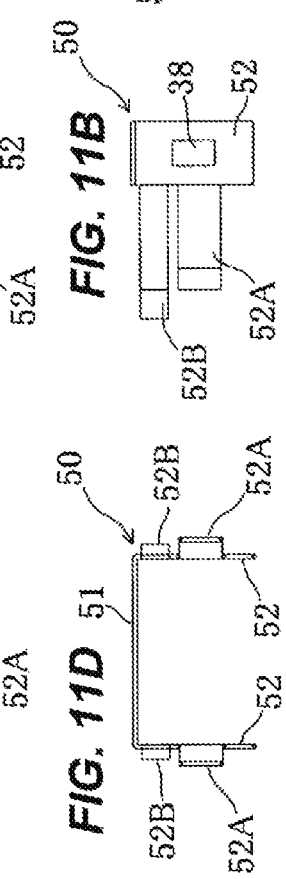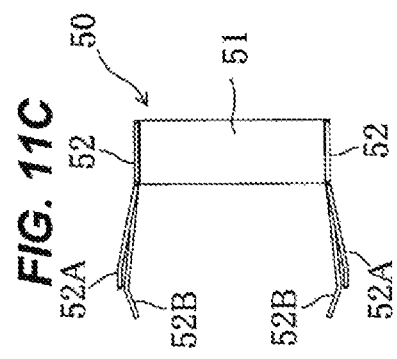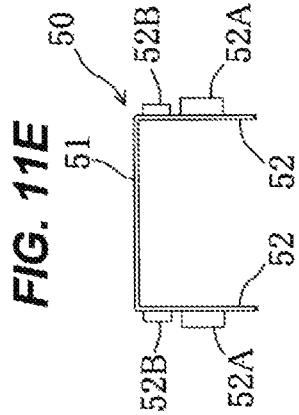

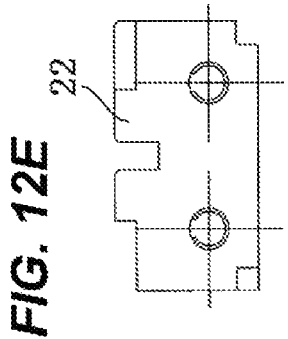
FIG. 12E
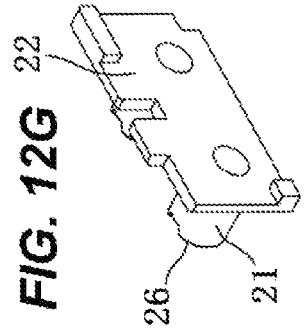
FIG. 12G
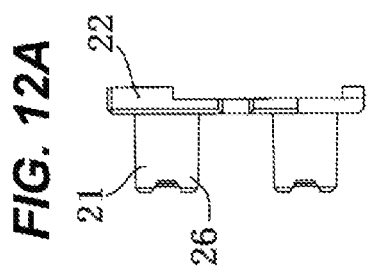
FIG. 12A
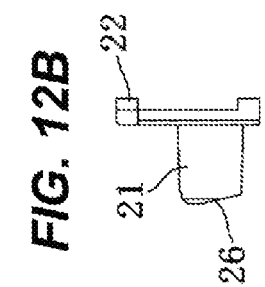
FIG. 12B
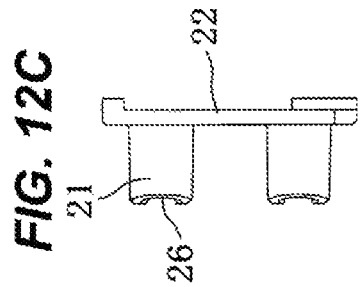
FIG. 12C
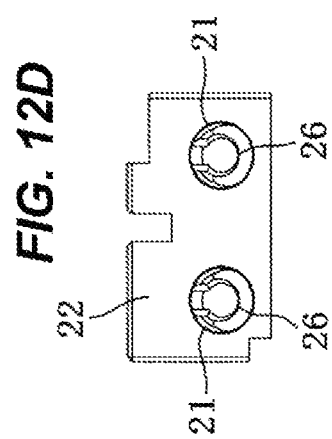
FIG. 12D
FIG. 12F

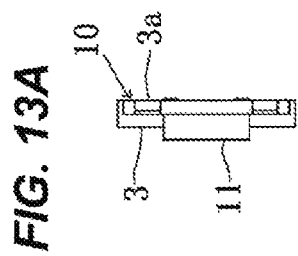
FIG. 13A
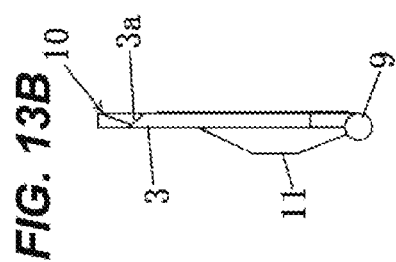
FIG. 13B
FIG. 13C
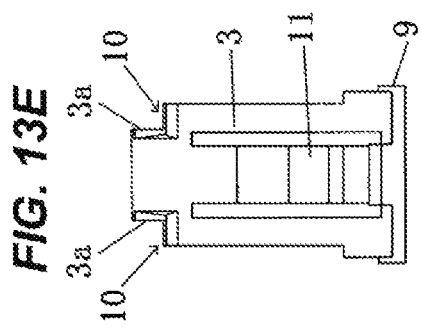
FIG. 13D
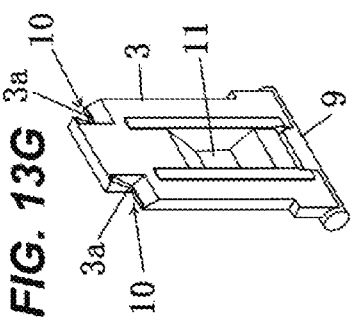
FIG. 13E
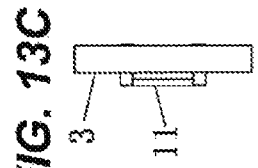
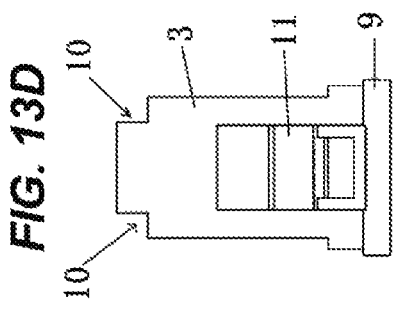
FIG. 13F
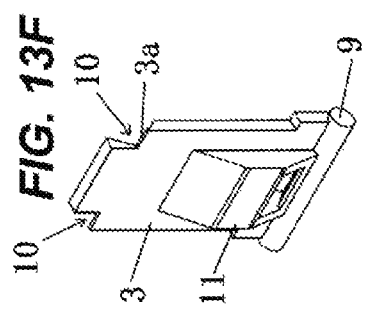
FIG. 13G

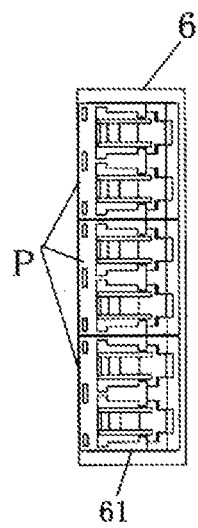
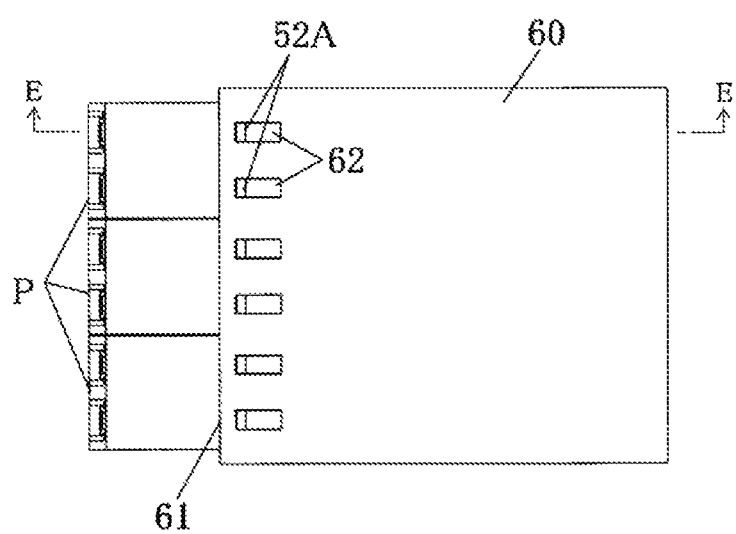
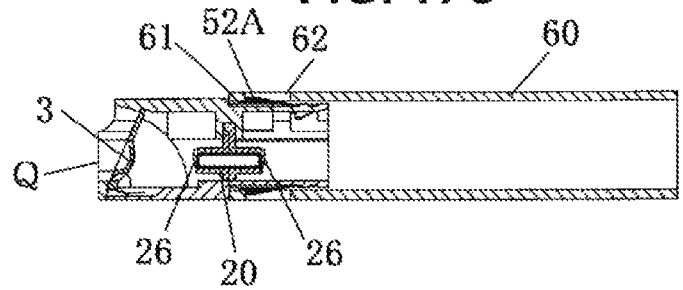
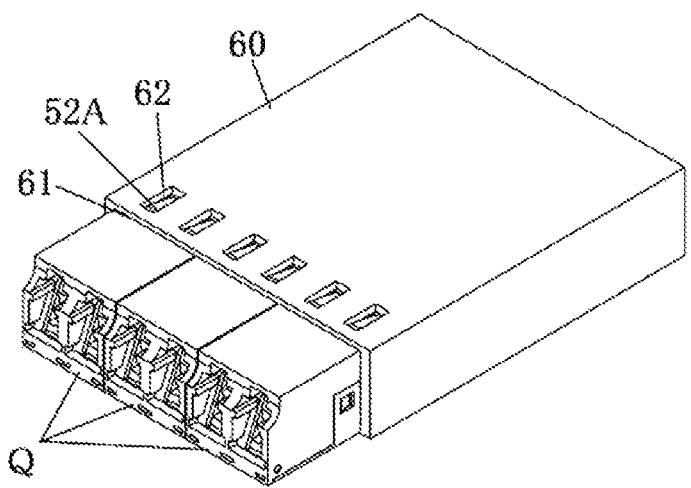

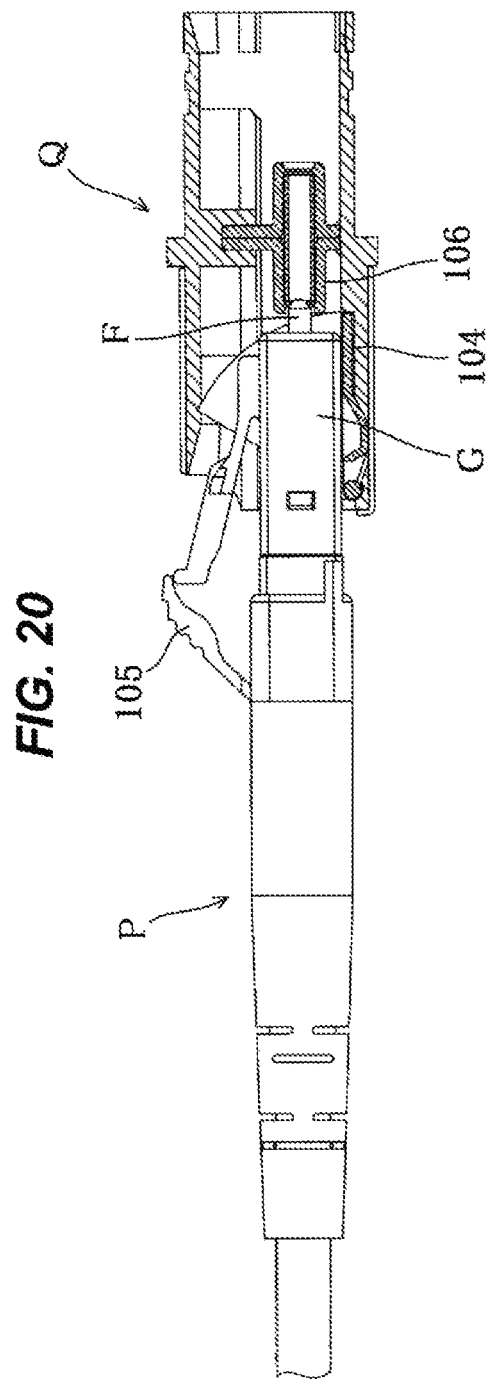

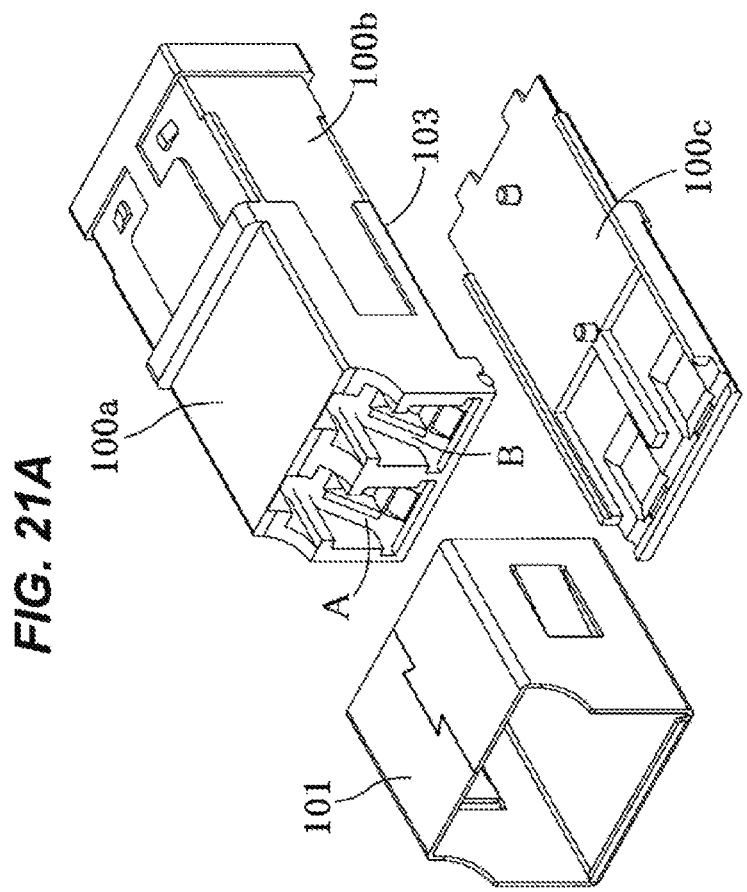
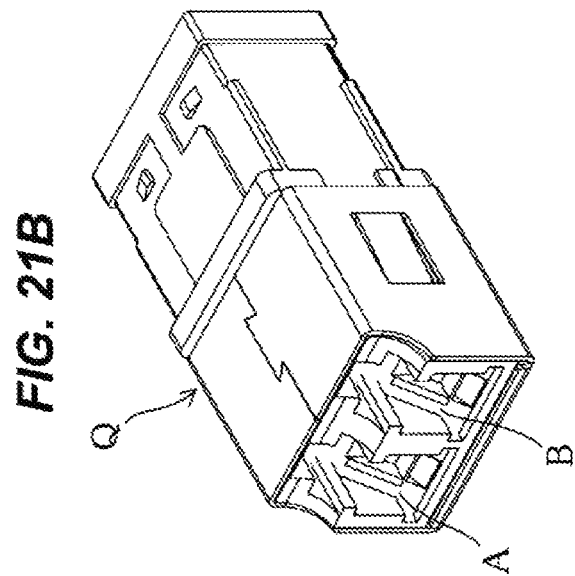
FIG. 21A
FIG. 21B

ADAPTER WITH LC-TYPE TWO-CORE SHUTTER

TECHNICAL FIELD

The present invention relates to an adapter with LC-type two-core shutter for interconnecting a pair of facing LC-type optical connector plugs.

BACKGROUND ART

Conventionally, in an adapter Q with LC-type two-core shutter shown in FIG. 20, FIGS. 21A to 21B, and FIGS. 22A to 22B, a dedicated device for employing an ultrasonic welding has been used when assembling it. Further, a shutter plate 104 is pushed away by a coupling sleeve G surrounding a ferrule F of a plug P, and the adapter Q is then formed so as to fit the ferrule F to a sleeve holder 106 in an inner portion of the adapter Q. At this time, an operating lever 105 is automatically pressed down by an inclined surface of the adapter Q in conformity to an insertion of the plug. The adapter Q shown in FIGS. 21A and 21B is formed into a rectangular tube body by attaching a bottom plate 100c to a downward opened adapter housing 103 according to a deposition using the dedicated device, the downward opened adapter housing 103 being formed as a door surface portion 102 having an inclined front face.

On the other hand, in the adapter Q shown in FIGS. 21A and 21B, an adapter housing 103 integrally having an upper wall 100a and right and left side walls 100b is formed, and a bottom wall 100c is attached between the right and left side walls 100b facing to the upper wall 100a of the adapter housing 103, so that the adapter Q is formed as a whole into a rectangular tube body including in both ends thereof fitting portions A and B which can insert a pair of facing LC-type optical connector plugs P and P from both ends each other. Further, a polygonal tube shaped holder 101 is installed to a front side of the adapter Q, the holder 101 being provided for attaching the bottom wall 100c to a bottom portion open side of the adapter housing 103 so as to fix to the right and left side walls 100b.

Further, as the adapter with LC-type two-core shutter, for example, as shown in Patent Literature 1, there has been known a dust proofing shutter built-in adapter for an LC-type optical connector structured such that a shutter plate is provided with a clearance portion for receiving in a non-contact state a ferrule leading end portion inserted from a diagonally upward direction side before being fitted, and the shutter plate is pushed away by a leading end open edge portion of a coupling sleeve which is provided so as to cover a periphery of the ferrule at the same time of receiving in the non-contact state the ferrule leading end portion by the clearance portion.

Further, as shown in Patent Literature 2, in order to previously prevent the LC-type optical connector plug from harming a body, particularly eyes of a worker when the LC-type optical connector plug having various concavo-convex shapes is fitted, there has been publicly known an LC-type optical connector interconnecting adapter having a guide groove which inserts and guides an LC-type optical connector plug from a fitting portion, and a depression portion which is adapted to a swing motion of a shutter plate, in an inner side of a side wall of a connector housing, and forming the guide groove by cutting out a part of the guide groove so as to have the same planar shape by the formation of the depression portion.

Further, as shown in Patent Literature 3, a side surface of a movable portion of a shutter plate (a side surface including a notch portion in an upper shoulder side and protruding portions in lower right and left sides) swings in an opening direction (to a lower side), however, the notch portion is formed in both upper right and left sides of the shutter plate (right and left shoulder sides via the protruding portion at the upper center) so as to be connected to the protruding portion at the upper center, thereby avoiding a contact with the latch piece when the shutter plate is rotated to the opening side. More specifically, there has been publicly known an adapter with shutter for an MU-type optical connector in which the shutter plate itself does not interfere with the latch piece when the shutter plate is rotated to the opening side even if an entire length of an adapter main body is small since the notch portion of the shutter plate is passed through a root position of the latch piece provided so as to face to both inner sides of the connector housing when rotating to the opening side.

CITATION LIST

Patent Literature

Patent Literature 1: Japanese Unexamined Patent Laid-Open Application No. 2015-059941
Patent Literature 2: Japanese Unexamined Patent Laid-Open Application No. 2014-139633
Patent Literature 3: Japanese Unexamined Patent Laid-Open Application No. 2015-219346

SUMMARY OF INVENTION

Technical Problem

However, since the conventional adapter Q with LC-type two-core shutter mentioned above uses the ultrasonic welding for assembling it, the dedicated device is required. In particular, a direction of the adapter Q is restricted when the adapter Q is attached to a cassette.

Further, since the adapter Q shown in FIGS. 22A and 22B is structured such that the bottom plate 100c is attached to the downward opened adapter housing 103 according to the deposition, there has been a risk that the bottom plate 100c is peeled due to an aged deterioration or a contact with the other adjacent adapter.

Further, the Patent Literature 1 mentioned above is structured such that the shutter plate is pushed away by the leading end open edge portion of the coupling sleeve provided so as to cover the periphery of the ferrule. However, in this case, there is a risk that an end portion of the sleeve holder comes into contact with the shutter plate due to a dimensional error of the shutter plate when opening and closing the shutter plate. Further, since a supporting projection below the shutter plate has been conventionally positioned in front of the housing and a thickness of a projection retaining portion in a front end is small to be weakened, and has been set at a high position when closing, an interference portion becomes great when rotating the shutter plate, so that there has been a problem that a guide performance is lowered and a bending withstand load of the fitted plug becomes smaller.

Further, in the case of the Patent Literature 2, since particularly the sleeve holder is formed into a vertical end surface in an opening portion into which a leading end of the ferrule is inserted, there has been a problem that the lower portion of the shutter plate tends to come into contact therewith when rotating to open and close.

Further, in the case of the Patent Literature 3, since the notch portions provided in both upper end sides of the shutter plate are formed so as to avoid the contact with the latch pieces provided in both inner sides of the connector housing (the adapter housing) when rotating the shutter plate to open and close, a gap tends to be generated in relation to the connector housing when rotating the shutter plate to close, and there has been a risk that light leakage, dust mixture are caused and the like.

Accordingly, the present invention is made by taking into consideration the conventionally existing various circumstances as mentioned above. An object of the present invention is to provide an adapter with LC-type two-core shutter in which it is not necessary to set any restriction of a direction of the adapter when attaching to a cassette, a sleeve holder has no fear of coming into contact with the shutter plate when opening the shutter plate, can improve a sealability between an adapter housing inner portion and the shutter, and a guiding performance and a retaining strength of the shutter itself, and can house an LC-type optical connector plug compactly, by employing a slide-lock type structure when assembling the adapter with shutter.

Solution to Problem

In order to achieve the object mentioned above, according to the present invention, there is provided an adapter with LC-type two-core shutter, the adapter including an upper lid housing which is provided in right and left wall surfaces with locking projections and provided in an upper wall surface with an arm, a shutter plate which is arranged in an opening side of the upper lid housing in a rising direction and freely opens and closes, a sleeve holder which has a split sleeve built-in, and a lower lid housing which is provided in right and left wall surfaces with locked hole portions for fitting the locking projections and provided in an upper wall surface with a locking concave portion locking the arm, wherein the upper lid housing and the lower lid housing are connected while holding the sleeve holder therebetween, by engaging the arm and the locking concave portion, and by engaging the locking projections and the locked hole portions.

Right and left latches or upper and lower latches are provided in the lower lid housings of both the housings connected to each other so as to be freely switched.

An end face of the sleeve holder is formed into a downward inclined surface shape from an upper side toward a lower side so as to prevent an upper side of the shutter plate from coming into contact with the sleeve holder when opening and closing the shutter plate.

Both upper end sides are provided with an L-type protrusion portion coming into contact with the locking wall of the adapter housing along an end edge so as to improve a sealability and achieve a stopper function, when sealing the shutter plate.

A retention portion bearing a projection in a lower end of the shutter plate is arranged at the rear of the upper lid housing, thereby increasing a thickness of the retention wall in the front end of the upper lid housing.

A lower end of the upper lid housing is provided with a through hole for inserting a fitting projection provided in a protruding manner in a leading end of a bottom plate of the lower lid housing.

A leaf spring is arranged for holding the rising of the shutter plate, and a transmission portion for passing a part of the light through is provided at the center of the leaf spring.

A transmission hole constructed by an approximately U-shaped notch or a hole is provided as the transmission portion at the center upper end of the leaf spring.

Effect of Invention

According to the present invention, it is possible to provide the adapter with LC-type two-core shutter in which it is not necessary to set any restriction of the direction of the adapter when attaching to the cassette, the end face of the sleeve holder has no fear of coming into contact with the shutter plate when opening the shutter plate, can improve the sealability between the adapter housing inner portion and the shutter, and the guiding performance and the retaining strength of the shutter itself, and can house the LC-type optical connector plug compactly, by employing the slide-lock type structure when assembling the shutter with shutter. As a result, it is possible to construct a security system for various optical connector plugs.

More specifically, the adapter includes the upper lid housing which is provided in the right and left wall surfaces with the locking projections and provided in the upper wall surface with the arm, the shutter plate which is arranged in the opening side of the upper lid housing in the rising direction and freely opens and closes, the sleeve holder which has the split sleeve built-in, and the lower lid housing which is provided in the right and left wall surfaces with the locked hole portions for fitting the locking projections and provided in the upper wall surface with the locking concave portion locking the arm, and the upper lid housing and the lower lid housing are connected while holding the sleeve holder therebetween, by engaging the arm and the locking concave portion, and by engaging the locking projections and the locked hole portions. As a result, it is possible to provide the adapter with LC-type two-core shutter easily and at a low cost on the basis of the slide-lock type connection structure, and any dedicated facility such as the ultrasonic welding is not required.

The right and left latches or the upper and lower latches are provided in the lower lid housings of both the housings connected to each other so as to be freely switched. As a result, it is possible to easily fix to an attachment plate on the basis of a one-touch operation of any one of vertical or lateral operations.

The end face of the sleeve holder is formed into the downward inclined surface shape from the upper side toward the lower side so as to prevent the upper side of the shutter plate from coming into contact with the sleeve holder when opening and closing the shutter plate. As a result, it is possible to house the shutter plate compactly in the adapter housing.

The both upper end sides are provided with the L-type protrusion portion coming into contact with the locking wall of the adapter housing along the end edge, when sealing the shutter plate. As a result, it is possible to achieve a stopper function at the position when sealing the shutter plate, and it is possible to prevent the light leakage and improve the sealability within the adapter housing. Further, it is possible to reduce the interference portion when rotating the shutter plate and it is possible to improve a guiding performance of the shutter plate.

The retention portion bearing the projection in the lower end of the shutter plate is arranged at the rear of the upper lid housing, thereby increasing the thickness of the retention wall in relation to the front end. As a result, a retention strength of the shutter plate is improved, thereby making a withstand load greater when bending the connector plug fitted to the adapter.

The lower end of the upper lid housing is provided with the through hole for inserting the fitting projection provided in the protruding manner in the leading end of the bottom plate of the lower lid housing. As a result, it is possible to securely prevent the bottom plate from dropping from the upper lid housing.

The leaf spring is arranged for holding the rising of the shutter plate, and the transmission portion for passing a part of the light through, for example, the transmission hole constructed by the approximately U-shaped notch or the hole is provided at the center of the leaf spring. As a result, it is possible to easily confirm conduction with the light which passes through from the shutter plate via a visible light.

BRIEF DESCRIPTION OF DRAWINGS

FIGS. 2A to 2F show an upper lid housing, in which FIG. 2A is a plan view, FIG. 2B is a side elevational view, FIG. 2C is a bottom elevational view, FIG. 2D is a front elevational view, FIG. 2E is a back elevational view and FIG. 2F is a perspective view.

FIGS. 3A to 3F show a lower lid housing, in which FIG. 3A is a plan view, FIG. 3B is a side elevational view, FIG. 3C is a bottom elevational view, FIG. 3D is a front elevational view, FIG. 3E is a back elevational view and FIG. 3F is a perspective view.

FIGS. 4A to 4E show a state after assembling, in which FIG. 4A is a plan view, FIG. 4B is a side elevational view, FIG. 4C is a bottom elevational view, FIG. 4D is a front elevational view and FIG. 4E is a back elevational view.

FIGS. 5A to 5D show the state after assembling, in which FIG. 5A is a perspective view of a state as seen from a diagonally forward side, FIG. 5B is a perspective view of a state as seen from a diagonally rearward side, FIG. 5C is a cross sectional view along a line A-A in FIG. 4E and FIG. 5D is a cross sectional view along a line B-B in FIG. 4E.

FIGS. 6A to 6E show a state after assembling for installing right and left latches, in which FIG. 6A is a plan view, FIG. 6B is a side elevational view, FIG. 6C is a bottom elevational view, FIG. 6D is a front elevational view and FIG. 6E is a back elevational view.

FIGS. 7A and 7B show the state after assembling for installing the right and left latches, in which FIG. 7A is a perspective view of a state as seen from a diagonally forward side and FIG. 7B is a perspective view of a state as seen from a diagonally rearward side.

FIGS. 9A to 9C show a state after assembling, in which FIG. 9A is a cross sectional view along a line C-C in FIG. 6E, FIG. 9B is a cross sectional view along a line D-D in FIG. 6E and FIG. 9C is a cross sectional view along a line E-E in FIG. 6E.

FIGS. 10A to 10F show right and left latches, in which FIG. 10A is a plan view, FIG. 10B is a side elevational view, FIG. 10C is a bottom elevational view, FIG. 10D is a front elevational view, FIG. 10E is a back elevational view and FIG. 10F is a perspective view.

FIGS. 11A to 11F show upper and lower latches, in which FIG. 11A is a plan view, FIG. 11B is a side elevational view, FIG. 11C is a bottom elevational view, FIG. 11D is a front elevational view, FIG. 11E is a back elevational view and FIG. 11F is a perspective view.

FIGS. 12A to 12G show a cylinder corresponding to a component of a sleeve holder, in which FIG. 12A is a plan view, FIG. 12B is a side elevational view, FIG. 12C is a bottom elevational view, FIG. 12D is a front elevational view, FIG. 12E is a back elevational view, FIG. 12F is a perspective view as seen from a diagonally forward side and FIG. 12G is a perspective view as seen from a diagonally rearward side.

FIGS. 13A to 13G show a shutter plate, in which FIG. 13A is a plan view, FIG. 13B is a side elevational view, FIG. 13C is a bottom elevational view, FIG. 13D is a front elevational view, FIG. 13E is a back elevational view, FIG. 13F is a perspective view as seen from a diagonally forward side and FIG. 13G is a perspective view as seen from a diagonally rearward side.

FIGS. 14A to 14G show a metallic spring, in which FIG. 14A is a plan view, FIG. 14B is a side elevational view, FIG. 14C is a bottom elevational view, FIG. 14D is a front elevational view, FIG. 14E is a back elevational view, FIG. 14F is a perspective view as seen from a diagonally forward side and FIG. 14G is a perspective view as seen from a diagonally rearward side.

FIGS. 15A and 15B show a state in which an adapter is attached to an attachment plate by the upper and lower latches, in which FIG. 15A is a plan view and FIG. 15B is a side elevational view.

FIGS. 16A and 16B show the state in which the adapter is attached to the attachment plate by the upper and lower latches, in which FIG. 16A is a plan view and FIG. 16B is a side elevational view.

FIGS. 17A to 17D show an adapter in a state in which three LC-type two-cores are installed side by side, in which FIG. 17A is a plan view, FIG. 17B is a front elevational view, FIG. 17C is a cross sectional view along a line E-E in FIG. 17A and FIG. 17D is a perspective view.

FIGS. 18A and 18B are cross sectional views listing up examples for attaching a shutter plate between a conventional example and the present embodiment, in which FIG. 18A is a cross sectional view of the conventional example and FIG. 18B is a cross sectional view of the present embodiment.

FIG. 20 is a cross sectional view of a state in which the plug is inserted into the adapter according to the conventional example.

FIGS. 21A and 21B show the adapter according to the conventional example, in which FIG. 21A is an exploded perspective view and FIG. 21B is a perspective view after assembling.

FIGS. 22A and 22B show the adapter according to the conventional example, in which FIG. 22A is an exploded perspective view and FIG. 22B is a perspective view after assembling.

DESCRIPTION OF EMBODIMENT

Figure 1:
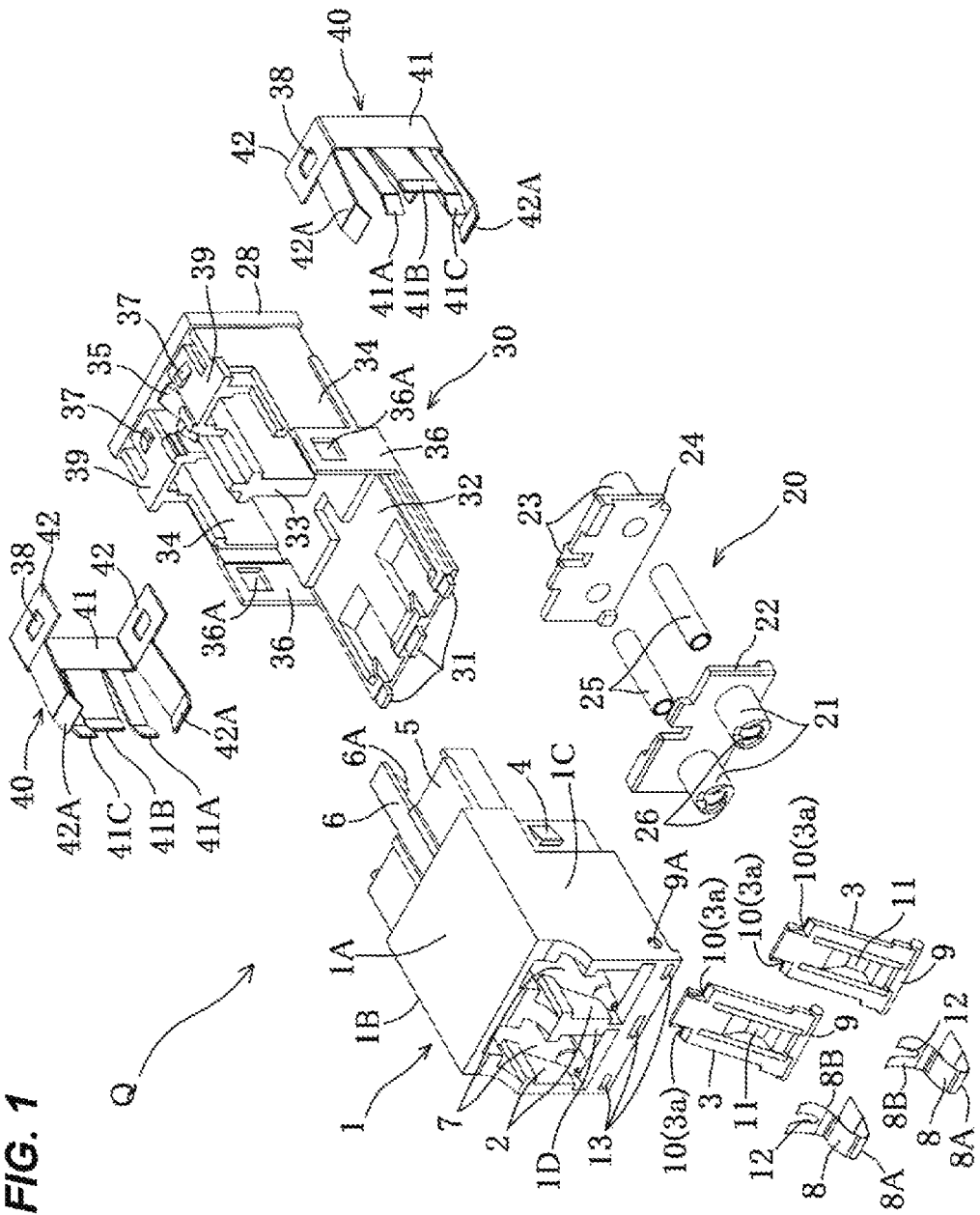
FIG. 1 is an exploded perspective view showing a mode for carrying out the present invention.
Figure 7A:
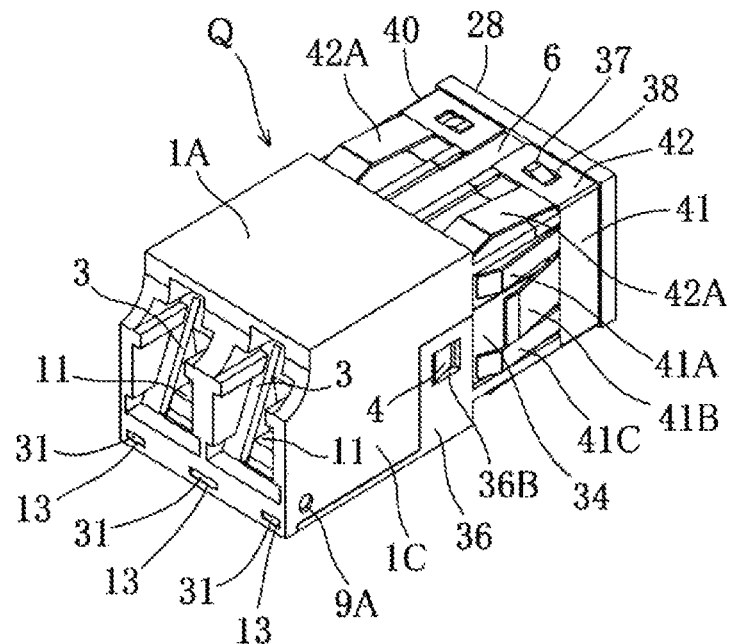
Figure 7B:
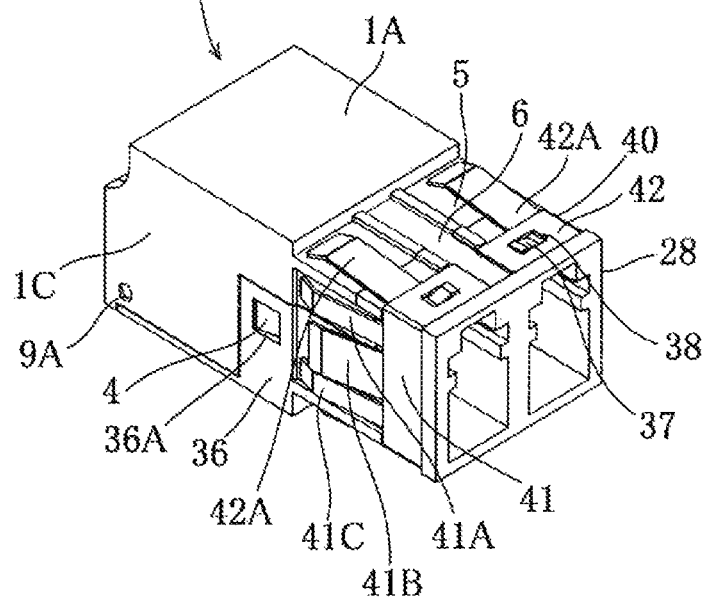
Figure 8:
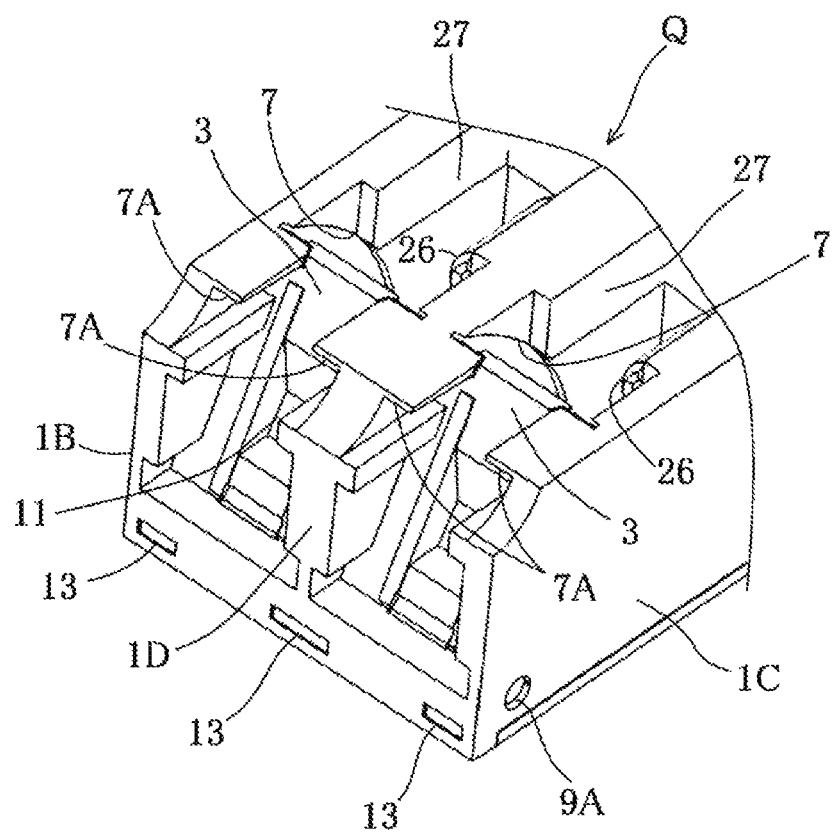
FIG. 8 is a perspective view showing a state of a substantial part of an opening portion as seen from a diagonally forward side.

A description will be in detail given below of an embodiment of an adapter with LC-type two-core shutter (hereinafter, refer to as "adapter Q") according to the present invention with reference to the accompanying drawings.

The adapter Q according to the present embodiment is constructed as an assembled mechanism according to a slide-lock type structure in which an upper lid housing 1 and a lower lid housing 30 are combined via an intermediate sleeve holder 20, as shown in FIG. 1 to FIG. 9C.

More specifically, the upper lid housing 1 mentioned above is constituted, as shown in FIG. 1 and FIGS. 2A to 2F, by opening portions 2 in a front face, shutter plates 3 which are arranged in a rising manner in an inner side of the opening portions 2, locking projections 4 which are respectively formed in rear portions of left and right side wall surfaces 1B and 1C and are engaged with locked hole portions 36A in side surfaces of a lower lid housing 30, a flat plate 5 which is protruded rearward from a portion somewhat below an upper wall surface 1A, and an arm 6 which is provided in a leading end thereof with a downward locking portion 6A protruding rearward at the center of the flat plate 5 so as to engage with a locking concave portion 35 provided at the center of a rear portion of the lower lid housing 30. Further, three through holes 13 are provided in a front lower end of the upper lid housing 1, and can be fitted to three fitting projections 31 which are formed in a leading end of a bottom portion 32 of the lower lid housing 30.

The shutter plate 3 is supported by a metal leaf spring 8 so as to give way to a horizontally arranged lid open state from a diagonally arranged closed state along right and left depression portions 7 which are formed in an inner side of the opening portion 2 in the front face of the upper lid housing 1, as shown in FIG. 1, FIG. 5D, FIG. 8 and FIG. 9B. More specifically, a first laterally penetrating projection 9 formed in a lower side of one shutter plate 3 is passed through a through hole 9A passing through a left wall surface and an inner wall surface in the inner side of the one opening portion 2, a second laterally penetrating projection 9 formed in a lower side of the other shutter plate 5 is passed through the through hole 9A passing through the inner wall surface and a right wall surface in the inner side of the other opening portion 2, and both the shutter plates 3 and 3 are arranged so as to form a pair of right and left plates via a center partition wall 1D. The shutter plate 3 is elastically retained by the metal leaf spring 8 arranged to be rolled in an outer side of the projection 9 arranged in a lower side of the shutter plate 3 so as to always rise upward.

Further, the shutter plate 3 is structured, as shown in FIG. 1, FIG. 8 and FIGS. 14A to 14G, such that notch portions 10 are formed in right and left upper sides thereof when the shutter plate 3 is sealed, and L-shaped protrusion portions 3a are respectively provided in a protruding manner in end edges of the notch portions 10. More specifically, the L-shaped protrusion portions 3a of the notch portions 10 are brought into contact with and retained to edge portions of locking walls 7A which are formed in inner side surfaces of the left and right side wall surfaces 1B and 1C in the vicinity of the opening portions 2 of the upper lid housing 1 and an outer surface of the center partition wall 1D so as to be diagonally arranged to the rear sides of the opening portions 2, thereby closing the opening portions 2 in an excellent sealing state. For information, reference numeral 27 in the drawing denotes a rectangular projection portion which is provided above a sleeve holder 20 mentioned later in the inner sides of the left and right side wall surfaces 1B and 1C of the upper lid housing 1 for improving an insertion performance of the plug P (improving a guiding performance and reducing an interference portion when the shutter 3 is rotated).

Figure 9A:
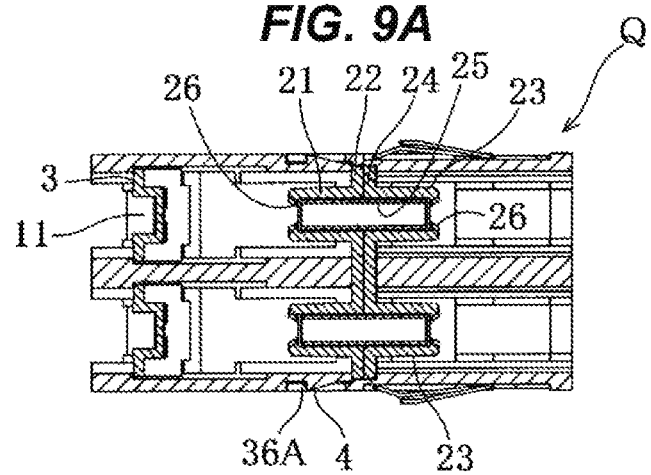
Figure 9B:
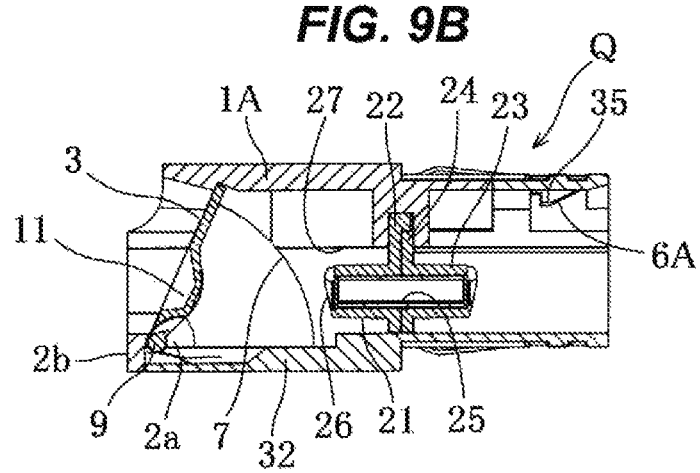
Figure 9C:
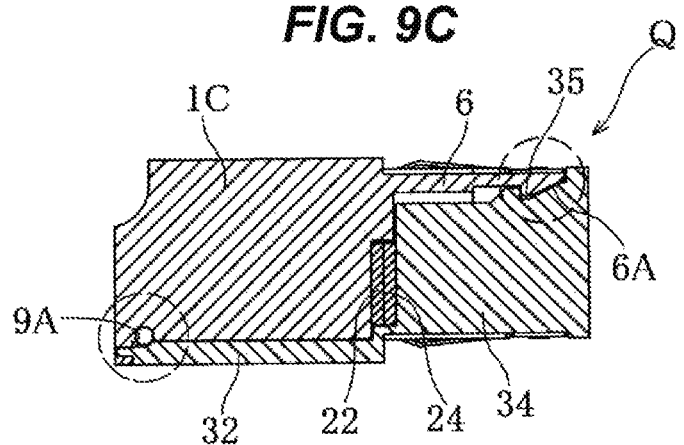
Figure 14A:
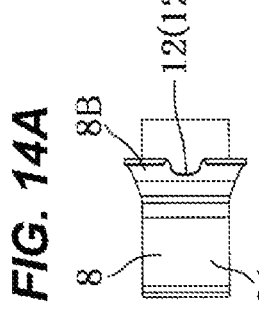
Figure 14B:
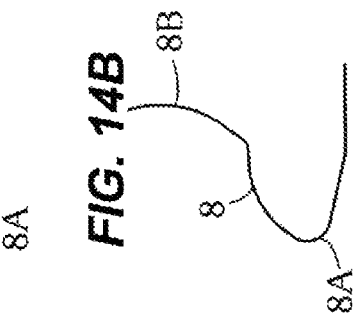
Figure 14C:
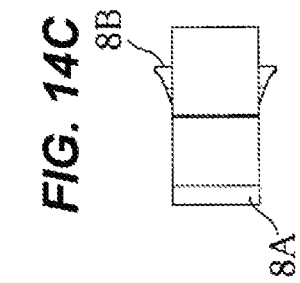
Figure 14D:
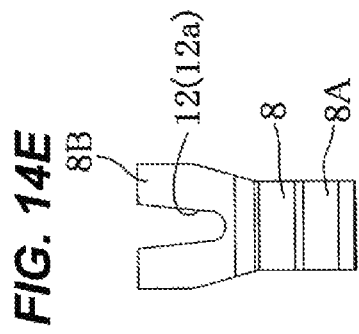
Figure 14E:
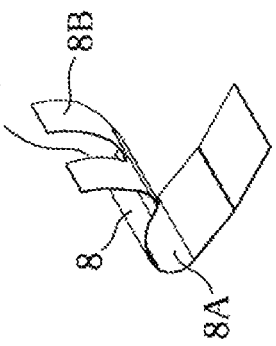
Figure 14F:
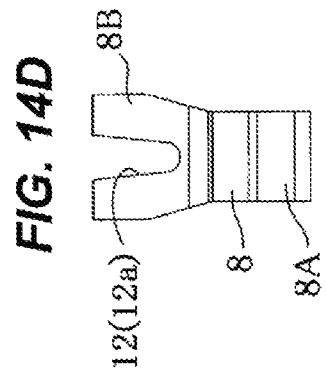
Figure 14G:
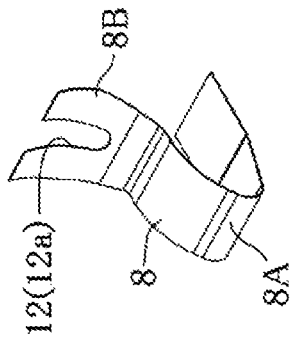
Figure 18A:
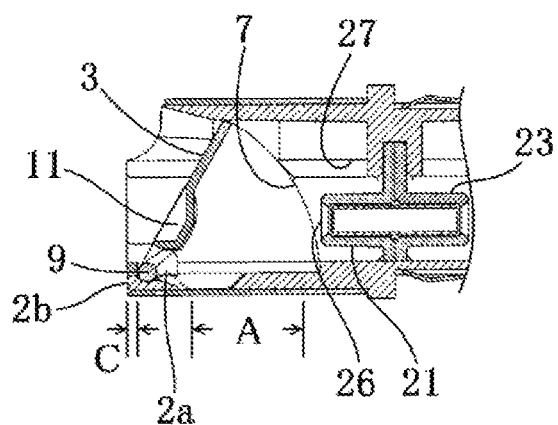
Figure 18B:
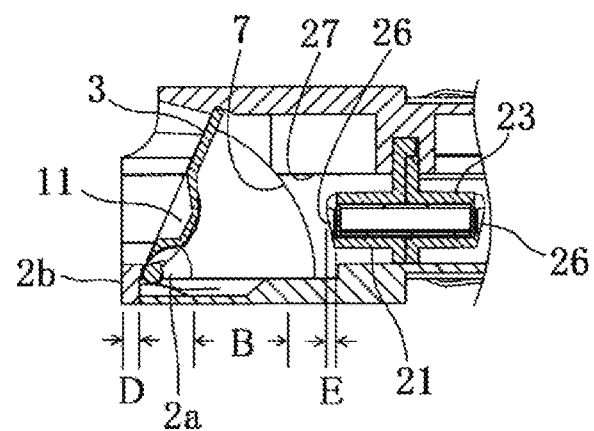

Further, as shown in FIG. 9B and FIG. 18B, since a retention portion 2a retaining the projection 9 in a lower end of the shutter plate 3 in the lower end of the upper lid housing 1 is positioned at the rear of the upper lid housing 1, a retention wall 2b provided below the front end of the housing is increased its thickness in a front-back direction. According to this structure, a strength of a position where the shutter plate 3 is attached is improved, a height of the shutter plate 3 can be lowered, and it is possible to prevent the shutter plate 3 from dropping. For information, a clearance portion 11 formed into a rectangular shape is provided approximately at the center of the front face of the shutter plate 3, and an intermediate portion of the clearance portion 11 is formed by a thin plate having a translucency.

In order to hold the rising of the shutter plate 3, the leaf spring 8 is provided at the center thereof with a transmission portion 12 for passing through a part of the light, as shown in FIGS. 14A to 14G. More specifically, the leaf spring 8 is formed into a U-shaped form in a lower portion 8A thereof so as to round the lower projection 9 of the shutter plate 3 from an outer side, and is curved in an upper portion 8B thereof in an inverse direction. A U-shaped transmission hole 12a is formed from the center of an upper end portion of the inversely curved upper portion 8B so as to correspond to the clearance portion 11. Therefore, the light comes into contact with the clearance portion 11 formed in the intermediate portion thereof into a thin plate through the transmission hole 12a, thereby making the light visible from a front side. For information, the U-shaped transmission hole 12a is formed in the transmission portion 12 in the present embodiment, however, a transmission hole 12a, for example, constructed by a round hole or the like may be formed in the other embodiment.

The sleeve holder 20 is formed by bonding a front holder portion 22 including first two cylinders 21 and 21 in a front face side, and a rear holder portion 24 including second two cylinders 23 and 23 in a rear face side via two split sleeves 25 and 25 at the center, as shown in FIG. 1, FIG. 5C, FIG. 5D, FIG. 9A and FIGS. 12A to 12G. Further, downward inclined surfaces 26 and 26 are respectively formed in both ends, that is, respective leading ends of the cylinders 21 and 21 in the front face side and the cylinders 23 and 23 in the rear face side downward from the upper side. For information, the downward inclined surface 26 may be formed only in one end of the sleeve holder 20 depending on a used condition.

The lower lid housing 30 has a bottom portion 32 in which a lower side is consistent with three through holes 13 arranged in a forward lower end of the upper lid housing 1, and a center partition wall 33 and right and left wall surfaces 34 and 34 which are provided in an upper side of the rear portion, and an upper side of a rear end portion of the center partition wall 33 is provided with a locking concave portion 35 to which an arm 6 provided at the center of the upward rear portion of the upper lid housing 1 is locked via a locking portion 6A in a front end lower side.

Further, as shown in FIG. 1, support surface portions 36 are respectively provided forward in the right and left wall surfaces 34 and 34 of the lower lid housing 30, the locked hole portions 36A are provided at the center of the support surface portions 36, and the locked hole portions 36A engage with the locking projections 4 which are respectively provided in a protruding manner in the rear portions of the left and right side wall surfaces 1B and 1C of the upper lid housing 1. Further, upper sides of rear end portions in the respective upper ends of the right and left wall surfaces 34 and 34 and a pair of right and left upper ends of the center partition wall 33 are covered with a cover body 39 each other, and the locking projections 37 inserted into and fixed to the locking holes 38 in both ends of the right and left latches 40 are formed at the vertically symmetrical center portions. For information, a flange portion 28 is provided in a rear end of the lower lid housing 30.

The right and left latches 40 are constructed by two same structures for covering a left lateral side and a right lateral side of the lower lid housing 30 as shown in FIGS. 10A to 10F. More specifically, each of the right and left latches 40 is formed into a C-shaped frame form in a front view having a long body portion 41 for covering a lateral side, and short side portions 42 covering upper and lower halves, and is provided with three segments 41A, 41B and 41C which are bent diagonally in their leading ends from an end portion of the long body portion 41, and segments 42A each one of which is bent diagonally in its leading end from an end portion of the short side portion 42.

In the meantime, in place of the right and left latches 40, as shown in FIGS. 11A to 11F, upper and lower latches 50 can be switchably formed as occasion demands. More specifically, in the upper and lower latches 50, nothing is provided in an end portion of a long body portion 51, and two segments 52A and 52B diagonally bent in their leading ends are provided in an end portion of a short side portion 52. The body portions 41 of the right and left latches 40 and the body portions 51 of the upper and lower latches 50 are prevented from coming off by a flange portion 28 provided in a rear end of the lower lid housing 30. For information, the right and left latches 40 and the upper and lower latches 50 are both constructed by a spring material, for example, made of metal and the like.

As mentioned above, as shown in FIG. 18A, the retention wall 2b of the retention portion 2a positioned in the front end of the projection 9 of the shutter plate 3 conventionally has the small thickness C, and is conventionally disposed at the position having the great width A when being closed. On the contrary, in the adapter Q of the present embodiment, as shown in FIG. 18B, the retention portion 2a retaining the projection 9 is moved rearward and has the thickness D which is greater than C, and is disposed at the position having the width B. More specifically, the distance C becomes conventionally thin since the distance A is great. On the contrary, in the present embodiment, the width D of the retention wall 2b can be made greater since the distance B is short. Further, since the downward inclined surface 26 having the width E shown in FIG. 18B is formed in the end surface of the sleeve holder 20, it is possible to reduce the interference portion when the shutter plate 3 is rotated, it is possible to improve the guiding performance, and it is possible to enlarge the bending withstand load of the fitted plug P, thereby making an entire of the adapter compact.

Figure 19:
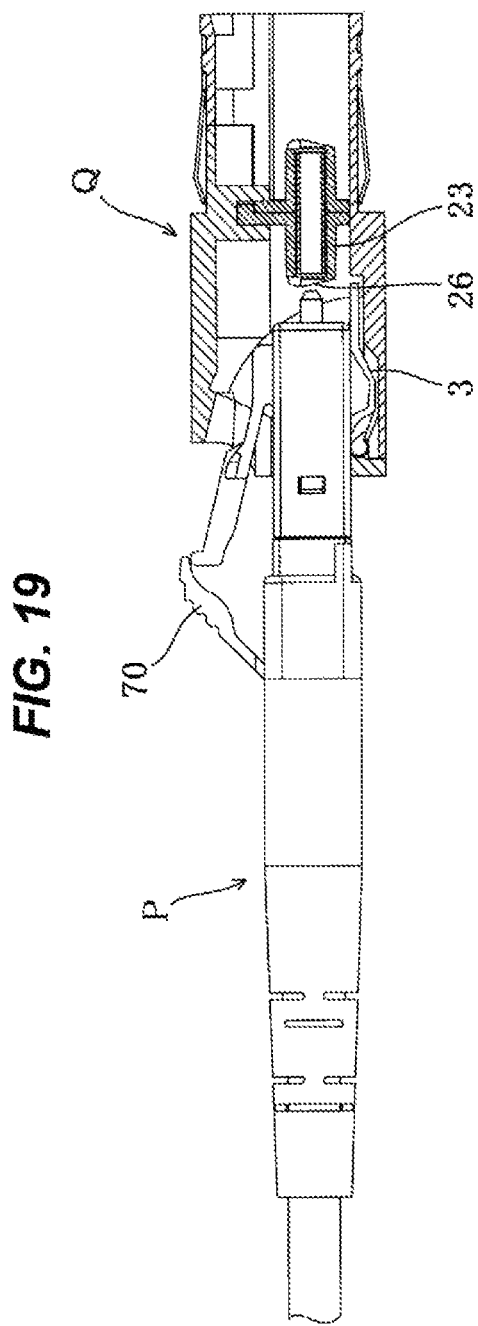
FIG. 19 is a cross sectional view of a state in which a plug is inserted into the adapter according to the present embodiment.
Figure 22A:
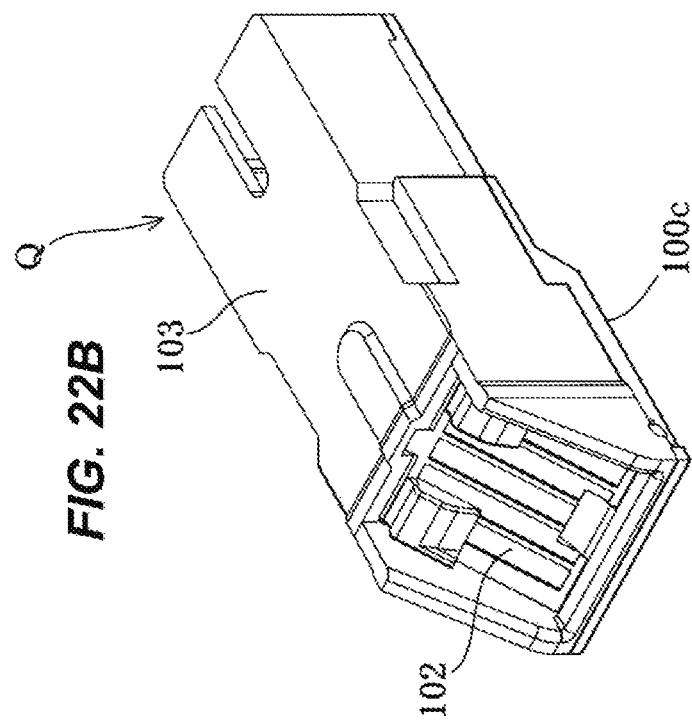
Figure 22B:
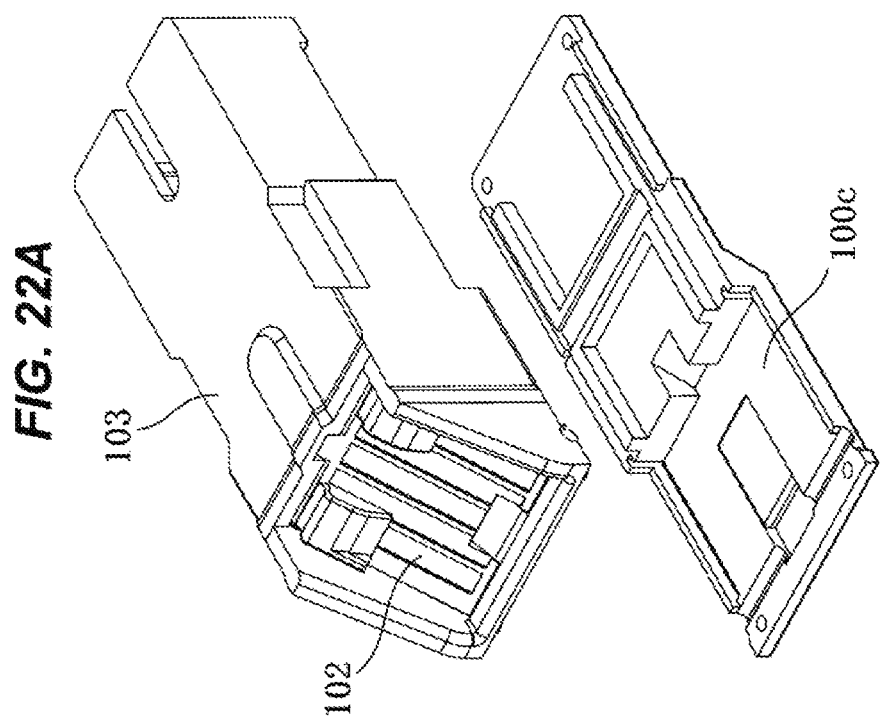

As mentioned above, as shown in FIG. 19, the leading end of the plug P is inserted toward the shutter plate 3 of the opening portion 2 in the adapter Q. At this time, since the operating lever 70 automatically presses downward and moves downward and the plug P is inserted as mentioned above, the shutter plate 3 is got down to a horizontal state. Then, since the first cylinders 21 and 21 do not exist on a circular arc locus of the shutter plate 3 (that is, since the downward inclined surface 26 exists), the shutter plate 3 can be smoothly opened without coming into contact with the sleeve holder 20.

Further, when the adapter Q is not used, the light passes through the clearance portion 11 of the closed shutter plate 3 from the rearward direction, so that a part of the light is visible from the front side. Therefore, it is possible to immediately determine from the rearward direction of the adapter Q whether or not the other side plug P is inserted.

Next, a description will be given of an example of an action in use with regard to the embodiment structured as mentioned above.

Figure 15A:
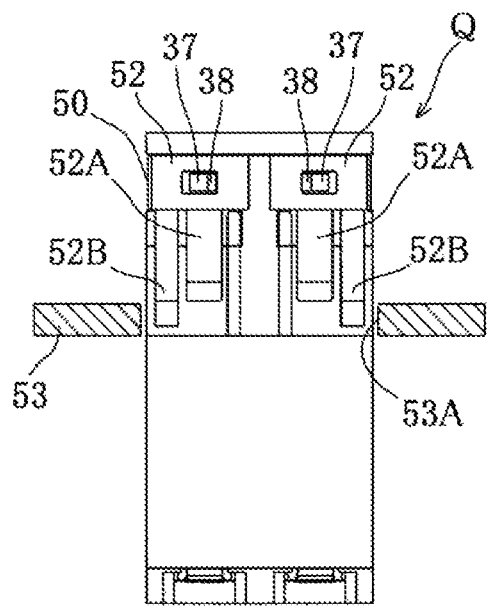
Figure 15B:
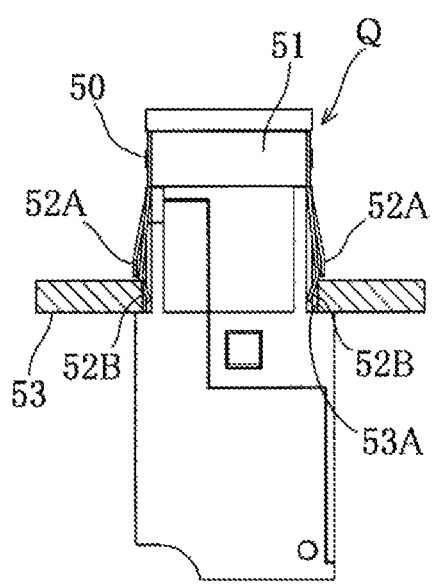

When the present embodiment is used, the adapter Q is first attached to the attachment plate 53 as shown in FIGS. 15A and 15B. At this time, the longer segment 52B out of two segments 52A and 52B is collapsed in the upper and lower latches 50 existing in the lower lid housing 30 and is accommodated in the opening portion 53A of the attachment plate 53. Further, the shorter segment 52A is pressure retained in front of the opening portion 53A of the attachment plate 53.

Figure 16A:
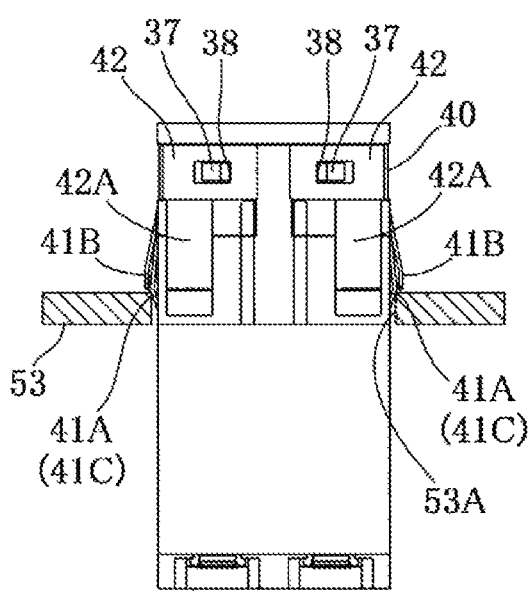
Figure 16B:
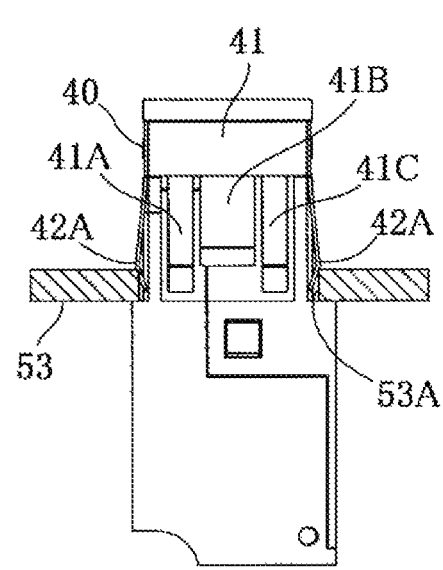

In the meantime, as shown in FIGS. 16A and 16B, the longer segments 41A and 41C out of three segments 41A, 41B and 41C and one segment 42A are collapsed in the right and left latches 40 existing in the lower lid housing 30 and are accommodated in the opening portion 53A of the attachment plate 53. Further, the shorter segment 41B is elastically retained in front of the opening portion 53A of the attachment plate 53.

Further, as shown in FIGS. 17A to 17D, in the case that three two-core adapters Q are arranged, first of all, these three adapters Q are collectively inserted into the opening portion 61 of the casing 60. At this time, two small holes 62 are respectively provided in both upper and lower surfaces in the vicinity of the opening portion 61 of the casing 60, and the shorter segment 52A is engaged with the right and left latches 50. Accordingly, three adapters Q are attached in parallel to the casing 60. In FIG. 17C, reference numeral 3 denotes a shutter plate, and reference numeral 20 denotes a sleeve holder where a downward inclined surface is provided in both ends.

The invention claimed is:

1. An adapter with LC-type two-core shutter, the adapter including:
    an upper lid housing which is provided in right and left wall surfaces with locking projections and provided in an upper wall surface with an arm;
    a shutter plate which is arranged in an opening side of the upper lid housing in a rising direction and freely opens and closes;
    a sleeve holder which has a split sleeve built-in; and
    a lower lid housing which is provided in right and left wall surfaces with locked hole portions for fitting the locking projections and provided in an upper wall surface with a locking concave portion locking the arm,
    wherein the upper lid housing and the lower lid housing are connected while holding the sleeve holder therebetween, by engaging the arm and the locking concave portion, and by engaging the locking projections and the locked hole portions.

2. The adapter with LC-type two-core shutter according to claim 1, wherein right and left latches or upper and lower latches are provided in the lower lid housings of both the housings connected to each other so as to be freely switched.

3. The adapter with LC-type two-core shutter according to claim 1, wherein
    an end face of the sleeve holder is formed into a downward inclined surface shape from an upper side toward a lower side so as to prevent an upper side of the shutter plate from coming into contact with the sleeve holder when opening and closing the shutter plate.

4. The adapter with LC-type two-core shutter according to claim 1, wherein the shutter plate is formed with notch portions in right and left upper end sides thereof, and L-shaped protrusion portions are respectively provided in the notch portions, and wherein the L-type protrusion portions come into contact with a locking wall of the upper lid housing along an end edge so as to improve a sealability and achieve a stopper function, when sealing the shutter plate.

5. The adapter with LC-type two-core shutter according to claim 4, wherein a retention portion bearing a projection in a lower end of the shutter plate is arranged at the rear of the upper lid housing, thereby increasing a thickness of the retention wall in the front end of the upper lid housing.

6. The adapter with LC-type two-core shutter according to claim 1, wherein a lower end of the upper lid housing is provided with a through hole for inserting a fitting projection provided in a protruding manner in a leading end of a bottom plate of the lower lid housing.

7. The adapter with LC-type two-core shutter according to claim 1, wherein a leaf spring is arranged for holding the rising of the shutter plate, and a transmission portion for passing a part of the light through is provided at the center of the leaf spring.

8. The adapter with LC-type two-core shutter according to claim 7, wherein the transmission portion comprises a transmission hole constructed by an approximately U-shaped notch or hole provided at the center upper end of the leaf spring.

\* \* \* \* \*